Patented Sept. 23, 1952

2,611,764

UNITED STATES PATENT OFFICE 2,611,764

COPOLYMERS OF OXIDIZED ISOBUTYLENE FRACTIONS WITH HYDROCARBONS

Edward M. Geiser, Downers Grove, and Armand J. de Rosset, Clarendon Hills, Ill., assignors to Universal Oil Products Company, Chicago, Ill., a corporation of Delaware No Drawing. Application September 9, 1949, Serial No. 114,905

15 Claims. (Cl. 260—80.7)

This invention relates to a process for producing a resin and more particularly to a process for producing a resin having elastomeric properties.

An object of this invention is to produce a resin.

Another object of this invention is to produce an elastomeric resin.

One specific embodiment of this invention relates to a process for producing a resin which comprises reacting a fraction of isobutylene oxidation products boiling above about 140° C. with at least one member of the group consisting of a conjugated diolefin and a vinyl aromatic hydrocarbon in the presence of a Friedel-Crafts catalyst.

Another embodiment of this invention relates to a process for producing a resin which comprises reacting a fraction of isobutylene oxidation products boiling above about 140° C. with at least one member of the group consisting of a conjugated diolefin and a vinyl aromatic hydrocarbon in the presence of a boron trifluoride catalyst.

A further embodiment of this invention relates to a process for producing a resin which comprises reacting a fraction of isobutylene oxidation products boiling above about 140° C. with at least one member of the group consisting of a conjugated diolefin and a vinyl aromatic hydrocarbon in the presence of a boron trifluoride-ether catalyst.

By this process, resinous products useful as elastomers or synthetic rubber and as coating materials for cloth, paper and the like, are formed by copolymerization of two and three component mixtures containing not less than 10% by weight of each component and not more than 50% by weight of any one component.

Broadly speaking, these components comprise (1) a liquid or characteristic fraction thereof generally boiling above about 140° C. and obtained by partial oxidation of an aliphatic monoolefinic hydrocarbon of not more than five carbon atoms of which class isobutylene is the preferred member; (2) a vinyl aromatic compound which is preferably styrene but which may be α-methyl styrene or another homolog of styrene or chlorinated styrene or vinyl naphthalene, etc.; and (3) a conjugated diolefin compound which is preferably butadiene but which may also be isoprene, chloroprene, cyclopentadiene, and related compounds.

The isobutylene oxidation product which is employed as a starting material in this process is prepared by separately preheating isobutylene and oxygen (or air) to a temperature of at least 180° C. to about 300° C. and a pressure above 500 pounds per square inch (35 atmospheres), mixing the two preheated materials and introducing the mixture into a reaction chamber wherein reaction is started by means of an electric spark or an electrically heated glow coil and the reaction thereafter is self-sustaining. The preferred operating temperature is from about 200° to about 250° C. when employing a reaction time of from about 10 to about 30 seconds, although the oxidation reaction may be carried out using a reaction time of from about 0.5 to about 60 seconds.

The liquid product obtained by such an oxidation treatment of isobutylene consists of organic acids, alcohols, aldehydes, ketones, and unsaturated compounds possessing a wide range of molecular weights.

The liquid product of isobutylene oxidation may be separated into various fractions by distillation and/or extraction to give the following components:

(1) Volatile material boiling up to about 140° C., (2) High boiling material insoluble in 4% sodium hydroxide solution, (3) Substantially non-volatile material insoluble in dilute phosphoric acid and (4) Substantially non-volatile material soluble in water but insoluble in ether.

Of these different oxidation products, components 2 and 3 which represent about 30% by weight of the liquid oxidation products and boil above about 140° C. are utilizable as starting materials for the production of our elastomeric resin. Copolymerization of these isobutylene oxidation products with a vinyl aromatic compound such as styrene and a conjugated diolefin such as butadiene or with either one of these vinyl aromatic or diolefinic materials may be carried out in the presence of a catalyst such as a molecular compound of boron trifluoride, of boron trifluoride and ether, of boron trifluoride and an aliphatic alcohol, and of boron trifluoride and water.

Other catalyst such as mild Friedel-Crafts metal halides may also be employed including aluminum chloride, aluminum bromide, ferric chloride, zinc chloride and the like. The reaction time in the presence of such catalysts may be from about one minute to two hours at temperature of from about —50° C. to about +20° C. at atmospheric pressures. At the end of the reaction time, the catalytic material may be removed from the reaction mixture by washing with a dilute aqueous solution of sodium carbonate and/or an alcohol.

While some reaction occurs between vinyl aromatic compounds and conjugated dienes and any one of the four components of isobutylene oxidation products mentioned above, it is preferred to employ components 2 and 3 as these contain a larger percentage of ingredients active in production of elastomeric resins. However, inclusion of fractions 1 and 4 or both before or after the reaction in the presence of copolymerizing catalyst affords an additional means of varying the nature of the finished product.

The nature of the present invention and type of results obtained are illustrated further by the following examples although these data should not be misconstrued to limit unduly the broad scope of the invention.

*Example I*

In this run, oxygen and isobutylene, separately preheated to 200° C. were rapidly mixed and introduced into a spherical reaction zone of 70 cc. capacity at flow rates of 3 and 15 mols. per hour, respectively. A pressure of 1200 p. s. i. and temperature of 220° C. were maintained in the reactor. Reaction was initiated by a glow coil and was self-sustaining thereafter. Liquid products, after removal of unreacted isobutylene, was produced at a rate of 260 grams per hour.

The product was vacuum distilled to give an essentially non-volatile fraction boiling above 140° C. which comprised essentially fractions 2, 3 and 4 of the fractions cited above. This "non-volatile" fraction was mixed with an approximately equal volume of styrene at 0–10° C. Addition of a $BF_3(C_2H_5)_2O$ catalyst resulted in an exothermic reaction. The product was extracted with alcohol and approximately 70% by weight of a soft, rubber-like material exhibiting elastomeric properties was obtained.

*Example II*

The non-volatile fraction of partially oxidized isobutylene boiling above 140° C. was mixed with an approximately equal volume of butadiene at −10° C. Approximately 1% by volume of $BF_3(C_2H_5)_2O$ as catalyst was added dropwise resulting in an exothermic reaction. The product was extracted with alcohol, and approximately 65% by weight of the charged materials was recovered as a rubber-like material.

*Example III*

The non-volatile fraction of partially oxidized isobutylene boiling above 140° C. was mixed with approximately an equal volume of a 50–50 mixture of styrene and butadiene at −10° C. Approximately 1% by volume of $BF_3(C_2H_5)_2O$ as catalyst was added dropwise, resulting in an exothermic reaction. The product was extracted with alcohol, and approximately 80% by weight of the charged materials were recovered as a soft, rubber-like material exhibiting elastomeric properties.

We claim as our invention:

1. A process for producing a resin which comprises reacting a fraction of isobutylene oxidation products boiling above about 140° C. with a conjugated diolefin at a temperature from about −50° to about +20° C. in the presence of a Friedel-Crafts catalyst, said oxidation products resulting from the reaction of isobutylene with oxygen at a temperature of from about 180° C. to 300° C. and at a pressure greater than about 35 atmospheres.

2. A process for producing a resin which comprises reacting a fraction of isobutylene oxidation products boiling above about 140° C. with a vinyl aromatic hydrocarbon at a temperature from about −50° to about +20° C. in the presence of a Friedel-Crafts catalyst, said oxidation products resulting from the reaction of isobutylene with oxygen at a temperature of from about 180° C. to 300° C. and at a pressure greater than about 35 atmospheres.

3. A process for producing a resin which comprises reacting a fraction of isobutylene oxidation products boiling above about 140° C. with at least one member of the group consisting of a conjugated diolefin and a vinyl aromatic hydrocarbon in the presence of a Friedel-Crafts catalyst at a temperature of from about −50° to about +20° C., said oxidation products resulting from the reaction of isobutylene with oxygen at a temperature of from about 180° C. to 300° C. and at a pressure greater than about 35 atmospheres.

4. A process for producing a resin which comprises reacting a fraction of isobutylene oxidation products boiling above about 140° C. with at least one member of the group consisting of a conjugated diolefin and a vinyl aromatic hydrocarbon in the presence of a boron trifluoride catalyst at a temperature of from about −50° to about +20° C., said oxidation products resulting from the reaction of isobutylene with oxygen at a temperature of from about 180° C. to 300° C. and at a pressure greater than about 35 atmospheres.

5. A process for producing a resin which comprises reacting a fraction of isobutylene oxidation products boiling above about 140° C. with at least one member of the group consisting of a conjugated diolefin and a vinyl aromatic hydrocarbon in the present of a boron trifluoride-ether catalyst at a temperature of from about −50° to about +20° C., said oxidation products resulting from the reaction of isobutylene with oxygen at a temperature of from about 180° C. to 300° C. and at a pressure greater than about 35 atmospheres.

6. A process for producing a resin which comprises reacting a fraction of isobutylene oxidation products boiling above about 140° C. with a mixture of butadiene-1,3 and styrene in the presence of a boron trifluoride-ether catalyst at a temperature of from about −50° to about +20° C., said oxidation products resulting from the reaction of isobutylene with oxygen at a temperature of from about 180° C. to 300° C. and at a pressure greater than about 35 atmospheres.

7. A process for producing a resin which comprises reacting a fraction of isobutylene oxidation products boiling above about 140° C. with butadiene-1,3 in the presence of a boron trifluoride-ether catalyst at a temperature of from about −50° to about +20° C., said oxidation products resulting from the reaction of isobutylene with oxygen at a temperature of from about 180° C. to 300° C. and at a pressure greater than about 35 atmospheres.

8. A process for producing a resin which comprises reacting a fraction of isobutylene oxidation products boiling above about 140° C. with styrene in the presence of a boron trifluoride-ether catalyst at a temperature of from about −50° to about +20° C., said oxidation products resulting from the reaction of isobutylene with oxygen at a temperature of from about 180° C. to 300° C. and at a pressure greater than about 35 atmospheres.

9. A process for producing a resin which comprises reacting at a temperature from about −50° to about +20° C. in the presence of a Friedel-Crafts catalyst a conjugated diolefin and a vinyl aromatic hydrocarbon with a fraction of liquids boiling above about 140° C. and resulting from the reaction of isobutylene with oxygen at a temperature of from about 180° to about 300° C. and at a pressure greater than about 35 atmospheres.

10. A process for producing a resin which comprises reacting at a temperature from about −50° to about +20° C. in the presence of a Friedel-Crafts catalyst at least one member of the group consisting of a conjugated diolefin and a vinyl aromatic hydrocarbon with a fraction of liquids boiling above about 140° C. and resulting from the reaction of an aliphatic monoolefinic hydrocarbon of not more than five carbon atoms with oxygen at a temperature of from about 180° to about 300° C. and at a pressure greater than about 35 atmospheres.

11. A resin comprising the copolymer of at least one member of the group consisting of a conjugated diolefin and a vinyl aromatic hydrocarbon with a fraction of liquids boiling above about 140° C. and resulting from the reaction of isobutylene with oxygen at a temperature of from about 180° to about 300° C. and at a pressure greater than about 35 atmospheres.

12. A resin comprising the copolymer of at least one member of the group consisting of a conjugated diolefin and a vinyl aromatic hydrocarbon with a fraction of liquids boiling above about 140° C. and resulting from the reaction of an aliphatic monoolefinic hydrocarbon of not more than five carbon atoms with oxygen at a temperature of from about 180° to about 300° C. and at a pressure greater than about 35 atmospheres.

13. A resin comprising the copolymer of a conjugated diolefin and a fraction of liquids boiling above about 140° C. and resulting from the reaction of isobutylene with oxygen at a temperature of from about 180° to about 300° C. and at a pressure greater than about 35 atmospheres.

14. A resin comprising the copolymer of a vinyl aromatic hydrocarbon and a fraction of liquids boiling above about 140° C. and resulting from the reaction of isobutylene with oxygen at a temperature of from about 180° to about 300° C. and at a pressure greater than about 35 atmospheres.

15. A resin comprising the copolymer of a conjugated diolefin, a vinyl aromatic hydrocarbon and a fraction of liquids boiling above about 140° C. and resulting from the reaction of isobutylene with oxygen at a temperature of from about 180° to about 300° C. and at a pressure greater than about 35 atmospheres.

EDWARD M. GEISER.
ARMAND J. DE ROSSET.

REFERENCES CITED

The following references are of record in the file of this patent:

UNITED STATES PATENTS

| Number | Name | Date |
|---|---|---|
| 2,212,900 | Groll | Aug. 27, 1940 |
| 2,438,340 | Johnson | Mar. 23, 1948 |

FOREIGN PATENTS

| Number | Country | Date |
|---|---|---|
| 360,822 | Great Britain | Oct. 30, 1931 |
| 667,163 | Germany | Nov. 5, 1938 |